United States Patent
Kowalski (10) Patent No.: US 9,305,258 B1
(45) Date of Patent: Apr. 5, 2016

(54) OPTIMIZATION OF CATEGORIZING DATA ITEMS IN A COMPUTING SYSTEM

(75) Inventor: Marcin P. Kowalski, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 713 days.

(21) Appl. No.: 13/472,761

(22) Filed: May 16, 2012

(51) Int. Cl.
*G06N 5/02* (2006.01)

(52) U.S. Cl.
CPC .......................................... *G06N 5/02* (2013.01)

(58) Field of Classification Search
None
See application file for complete search history.

(56) References Cited

U.S. PATENT DOCUMENTS

| 2005/0204402 | A1* | 9/2005 | Turley et al. | 726/11 |
| 2006/0248580 | A1* | 11/2006 | Fulp et al. | 726/11 |
| 2009/0172800 | A1* | 7/2009 | Wool | 726/11 |

OTHER PUBLICATIONS

Radomskiy, S. "Security policy rules optimization and its application to the Iptables firewall." University of Tampere, School of Infomration Sciences (2011). [retrieved Dec. 3, 2014]. [retrieved from tampub.uta.fi].*

* cited by examiner

*Primary Examiner* — Kakali Chaki
*Assistant Examiner* — Eric Nilsson (57) ABSTRACT

A set of techniques is described for optimizing the categorization of data items in a computing system. The techniques include continuously metering data items by traversing each data item through a chain of rules in a sequential order until the data item matches a rule. Once the item matches the rule, it can be successfully categorized. The system can then analyze the number of matches for each rule over a period of time and optimize the sequential order of the chain of rules according to the analysis of the number of matches. For example, the system can modify the sequential order by arranging the rules according to the number of matches of each rule. Alternatively, the system may compute a velocity of matches and use it to optimize the sequential order. Alternatively, the system may use the rate of change to optimize the sequential order.

24 Claims, 6 Drawing Sheets

OPTIMIZATION OF CATEGORIZING DATA ITEMS IN A COMPUTING SYSTEM

BACKGROUND

As an ever increasing number of applications and services are being made available over networks such as the Internet, a number of content, application, and/or service providers are turning to technologies such as remote resource sharing and cloud computing. Cloud computing is a general term often used to describe the process of providing access to electronic resources through services, such as Web services, where the hardware and/or software used to support those services is made to be dynamically scalable to meet the needs of the services at any given time. A user or customer typically will rent, lease, or otherwise pay for access to resources through the cloud, and thus does not have to purchase and maintain the hardware and/or software to provide access to these resources. A service provider that owns those resources will usually take on the responsibility of maintaining and managing the resources, ensuring that they are highly available, scalable and otherwise ready to provide the necessary services.

In such cloud based environments, service providers typically want to meter the usage of their resources for various purposes, such as to determine appropriate amounts to charge their customers. For example, many service providers wish to charge customers based on the amount of data or bandwidth that their device(s) or application(s) consumes. In certain instances, however, the processes used for metering the resources may actually introduce some amounts of latency, network jitter or other interference with the regular processing of the system. It is thus desirable to minimize such interference caused by usage metering and monitoring in order to provide a better service to the users.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for categorizing or organizing information in an electronic environment. In particular, the various embodiments provide approaches for dynamically optimizing metering paths, or other rule sequences that may be applied to data items passing through a system, according to runtime rule matching counts, frequencies or other usage criteria.

In accordance with various embodiments, one such approach involves a system that meters incoming or outgoing data items (e.g. IP packets) according to a defined set of rules. In at least one embodiment, the rules are applied to the data items in a particular predetermined sequence or order. As such, each data item traverses the rules in the specified order until it is found to match one of the rules, at which point the data item can be categorized, filtered or otherwise identified in some manner as having matched the rule. In this situation, the amount of processing taken for each data item can be dependent on the number of rules that the data item has to traverse before it can be successfully categorized. For example, if the data item matches the first or second rule in the sequence, the processing time to categorize the item would be lower than the processing time for a data item that only matches the tenth or eleventh rule in the sequence and so on. In an environment where the system is processing extremely large amounts of data, this impact on throughput may become quite substantial and undesirable. For example, in systems that process hundreds of thousands or millions of packets per second, longer processing times taken to match the data items may significantly increase the perceived latency and/or network jitter.

In accordance with various embodiments described herein, the system can dynamically optimize the ordering of the rules based on matching frequency or other usage criteria. In one embodiment, the system can meter the data items being processed and determine a matching frequency for rules over a specified period of time. For example, the system may periodically inspect the matching counts for the rules to determine how many data items were matched by each rule in a given time interval. In one embodiment, based on this matching frequency, the system may dynamically modify the order in which the rules will be applied for the future data items. For example, the system may move the rule that matched the most data items to the beginning of the sequence and move the rule that matched the least number of data items to the end of the sequence and so on. Alternatively, the system can measure the velocity of matches per unit time, such as by comparing the number of matches during several time intervals and determining the velocity of matches between those intervals. Yet in other embodiments, the system can modify the order of the rules based on the acceleration (i.e. rate of change of the velocity) which may allow for faster ramp in the event of new system behavior.

In accordance with an embodiment, the system may optimize the order of the rules by either modifying the rules at runtime (e.g. deleting a rule in memory and writing a new rule in its place) or alternatively, by creating a new set of rules with a modified order and replacing the current set of rules with the new set. In one embodiment, it may be useful to create the new set of rules in order to reduce any latency that may be introduced by the modifications if a substantial number of rules need to be shifted around in the sequence.

Figure 1:
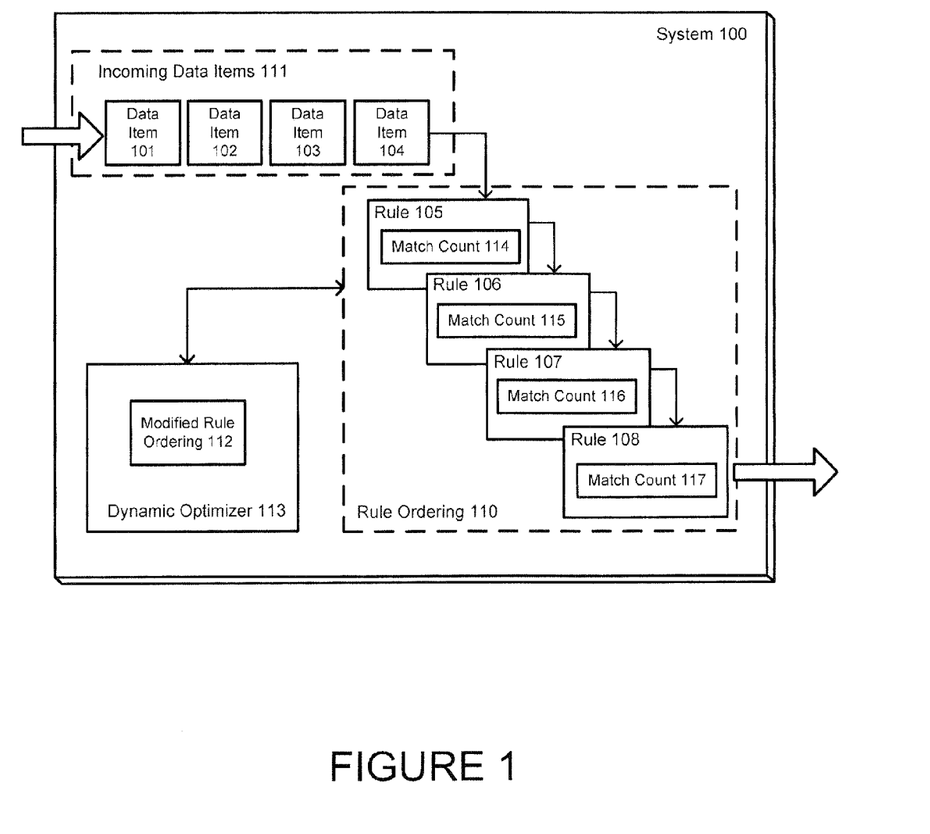
FIG. 1 is an example of dynamic optimization of ordering for rules that can be applied to data items, in accordance with various embodiments.

FIG. 1 is an example of dynamic optimization of ordering for rules that can be applied to data items, in accordance with various embodiments.

In the illustrated embodiment, system 100 that utilizes one or more forms of categorization is shown. In particular, the system may categorize incoming data items 111 based on a set of rules (105, 106, 107, 108) or other conditions that each data item (101, 102, 103, 104) will traverse in order to be successfully metered by the system 100. In accordance with various embodiments, the data items (101, 102, 103, 104) may include but are not limited to Internet Protocol (IP) network packets, bytes, characters or any other unit of data that can be processed by a computing system 100. The set of rules (105, 106, 107, 108) may be any logical expressions, including but not limited to ipchains, iptables, packet filtering rules, conditional statements or other constructs.

In accordance with an embodiment, the set of rules (105, 106, 107, 108) may be statically defined and traversed at runtime by each data item (101, 102, 103, 104) that needs to be metered by the system. In one embodiment, the rules form chains that the data items traverse in a defined order 110 or sequence. The order may be determined at the start of the metering system 100. By way of example, when the system receives data item 104, it evaluates information contained in that data item 104 against each rule in the chain (105, 106, 107, 108) in the order 110 until the data item 104 is found to match one of the rules. The system can then increment the matching frequency count (114, 115, 116, 117) for that rule and forward the data item 104 to its intended recipient (e.g. application, service, external client or other component). Subsequently, the system may receive data item 103 and meter it in the same fashion. The metering can be performed by the system 100 for a wide variety of purposes, such as charging, billing, firewall, filtering, security, application monitoring, or the like. For example, a service provider may utilize the metering system to measure data usage of its customers and charge them according to how much data or bandwidth each customer consumes.

In accordance with an embodiment, the metering system 100 includes a dynamic optimizer component 113 that periodically inspects the rule matching counts (114, 115, 116, 117) and modifies the order or sequence of the rule chain that is being applied to the data items. For example, the dynamic optimizer may check the rule matching counters (114, 115, 116, 117) every ten minutes (or some other specified time period) and determine that certain rules which were at the end of the sequence have been matched to a high number of data items with respect to other rules in the sequence. Based on this information, the dynamic optimizer may move those rules closer to the beginning of the sequence based on the assumption that these rules are likely to match more data items in the future than other rules in the chain.

In various embodiments, the metering system 100 may measure the rule matching frequency for each rule according to the number of packets that matched the rule or according to the number of bytes that were matched by the rule. This may create different results depending on whether the system uses packets that contain large amounts of data or small amounts of data. In at least one embodiment, a combination of bytes and packets measurement can be utilized. For example, the byte count can be assigned a relative weight (e.g. 30%) and the packet weight can be assigned another relative weight (e.g. 70%) and the sequential order of the rules may be adjusted based on the combination of both metrics. In alternative embodiments, the metering system may utilize some other form of measurement quantify the rule matching counts.

In accordance with an embodiment, the dynamic optimizer 113 of metering system 100 may optimize the sequence by arranging the rules according to the number of data items that each rule matched over the specified time interval. In this embodiment, the rule having the highest number of data item matches will be positioned first in the sequence, the rule having the next highest number of matches will be placed second and so on. In an alternative embodiment, the dynamic optimizer 113 can compute the velocity of matches over a plurality of time intervals and use the velocity to optimize the rule sequence. For example, if a rule matched 50,000 packets over the first time interval and 55,000 packets over the next time interval, the optimizer may use the difference to determine the velocity of matches for that rule. The optimizer may then choose to place the rule having the highest velocity in the beginning of the rule chain. In an alternative embodiment, the optimizer may further compute the acceleration of matches based on the rate of change of the velocity and utilize that information to optimize the rule order. For example, if the velocity of a particular rule has growing significantly over the last several intervals, the rate of change may indicate that this rule should positioned first in the sequence and the optimizer may modify the rule chain accordingly. In various alternative embodiments, a wide variety of other algorithms and parameters may be utilized by the metering system to optimize the rule order.

Once the dynamic optimizer has determined a more optimal rule sequence, it may apply the changes to the existing rule chain. In accordance with an embodiment, the dynamic optimizer 113 can modify the existing rule chain by moving one rule to a different memory location, such as by deleting it from one memory address and writing it into a new address (e.g. an address higher or lower in the sequence). In an alternative embodiment, the optimizer may create a new set of rules organized in a new sequence 112 and replace the existing rule chain 110 with the new rule chain 112. The latter approach may spare the expense of writing and deleting multiple slots in the rule chain and therefore may be particularly useful when there are many changes to be made in the rule ordering.

As previously described, the techniques for dynamically optimizing the metering path described above may be utilized in a variety of different environments. In accordance with an embodiment, the techniques may be utilized by a service provider (e.g. cloud computing service provider) to meter resource usage and to charge its customers accordingly.

Figure 2:
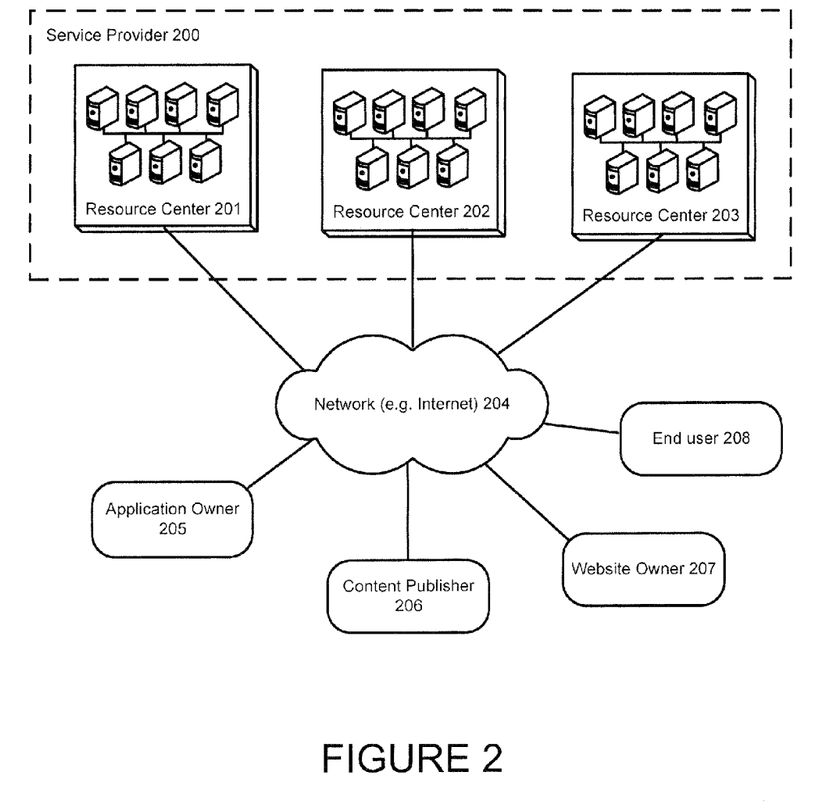
FIG. 2 is a general illustration of a service provider environment that may utilize dynamic metering path optimization, in accordance with various embodiments.

FIG. 2 is a general illustration of a service provider environment, in accordance with various embodiments.

As illustrated, a service provider 200 can offer to its customers a set of computing resources as physical or virtual machines, raw (block) storage, firewalls, load balancers and networks. In accordance with an embodiment, the service provider 200 can supply these resources on demand from its large pools installed in one or more resource centers (201, 202, 203). For wide area connectivity, a network 204 can be used to connect and expose those resources to various users. As used throughout this disclosure, a network 204 can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers (201, 202, 203) can include any physical or logical grouping of resources, such as a data center, a server farm, and the like.

In accordance with an embodiment, a customer of the service provider, such as an application owner 205, content publisher 206, or website owner 207 may deploy and run their services on the physical resources of the service provider. For example, the application owner 205 may install its operating system images as well as its application software on the machines located in the data centers of the service provider 200. In this embodiment, the customer may be responsible for maintaining the operating systems and application software. The service provider may bill on a utility computing basis, wherein the cost to the customer reflects the amount of resources consumed by the customer's application.

In various embodiments, the data centers of the service provider can be distributed in several geographical regions and availability zones for purposes of lower latency and high availability. By way of example, availability zones can be distinct locations that are engineered to be insulated from failures in other availability zones and provide inexpensive, low latency network connectivity to other availability zones in the same region. By launching instances in separate availability zones, applications can be protected from failure of a single location. Regions may include one or more availability zones and may be geographically dispersed, and located in separate geographic areas or countries. For example, regions may include United States (US) East (Northern Virginia), US West (Oregon), US West (Northern California), EU (Ireland), Asia Pacific (Singapore), Asia Pacific (Tokyo), South America (Sao Paulo) and the like.

Figure 3:
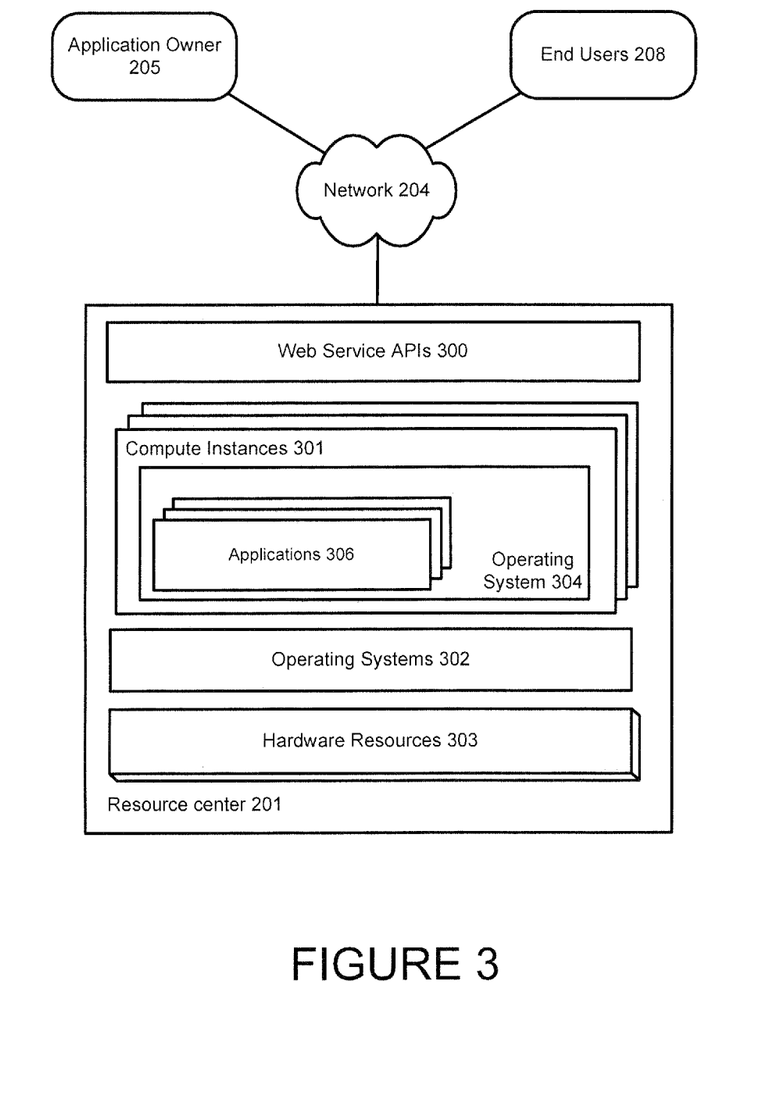
FIG. 3 is an illustration of the various resources provided by the service provider which can be metered, in accordance with various embodiments.

FIG. 3 is an illustration of the various resources provided by the service provider, in accordance with various embodiments. As illustrated, the resources of the resource center 201 may include a set of physical hardware devices 303, including but not limited to computer servers, hubs, switches, bridges, racks, firewalls and other network devices. These devices are used to deploy and execute the applications and services of the customers of the service provider 200.

The service provider 200 can supply a set of web service application programming interfaces (APIs) 300 that provide resizable compute capacity (e.g. server capacity) on the network. For example, a customer of the service provider (e.g. application owner 205) can bundle the operating system, application software and associated configuration settings into a machine image. These machine images can then be used to provision one or more virtualized compute instances (e.g. server instances) 301 which will run the customer's applications 306. Additionally, the compute instances 301 can be decommissioned using simple web service calls to scale capacity up and down quickly, as the capacity requirements of the applications 306 change. In certain embodiments, an automatic scaling service can be configured to manage the scaling needs of the application, automatically provisioning additional server instances when the workload of the application increases and removing server instances when workload decreases.

In accordance with one embodiment, a compute instance is a virtual server instance assigned as a unit of compute capacity to the application owner 205 and used by the service provider to measure the hardware resource 303 consumption. In alternative embodiments, the compute instance may be the actual physical device that runs an application on behalf of the customer. In at least one embodiment, each compute instance 301 may include its own operating system 304 which runs the one or more application(s) 306 on that compute instances. The operating system may be provided as part of a complete machine image by the application owner or other customer of the service provider. For example, the user may provide a machine image that includes the operating system, the application and all of the configuration information for running the application on the compute instance. The service provider may then use the machine image to instantiate as many instances of the application as desired on the service provider's resources. The various applications may perform any number of functions, such as request processing serving data, and the like.

In various embodiments, the service provider 200 may provide compute instances on a per-hour charging basis, for one-time payment or create a market place for customers bid for unused capacity of the various server instances. Instances can be launched in one or more geographical regions. Each region may have multiple availability zones which are distinct locations that are engineered to be insulated from failures in other availability zones.

In accordance with an embodiment, each compute instance is assigned a role at boot time. For example, an instance can be designated a database server, an application server, a slave server and the like. The role may be passed in as an argument during launch that instructs the compute instance to perform a sequence of steps after it has booted. On boot, a compute instance can retrieve the necessary resources (e.g. code, scripts, configuration, etc.) based on the role assigned to it and the instance can attach itself to a cluster to serve its function (e.g. execute an application).

In accordance with an embodiment, the application owner 205 can be assigned an account by the service provider. The account can contain all of the resources utilized by the application owner, including compute instances, database instances, security resources (e.g. policies, groups, users, etc.), scaling services and the like. The account can be a secured account, wherein access to it is controlled and restricted to a selected group of users that may access and manipulate the various resources of the account. In accordance with an embodiment, the service provider may utilize the metering system 100 to meter the usage of the various resources that the customer's account has access to.

Figure 4:
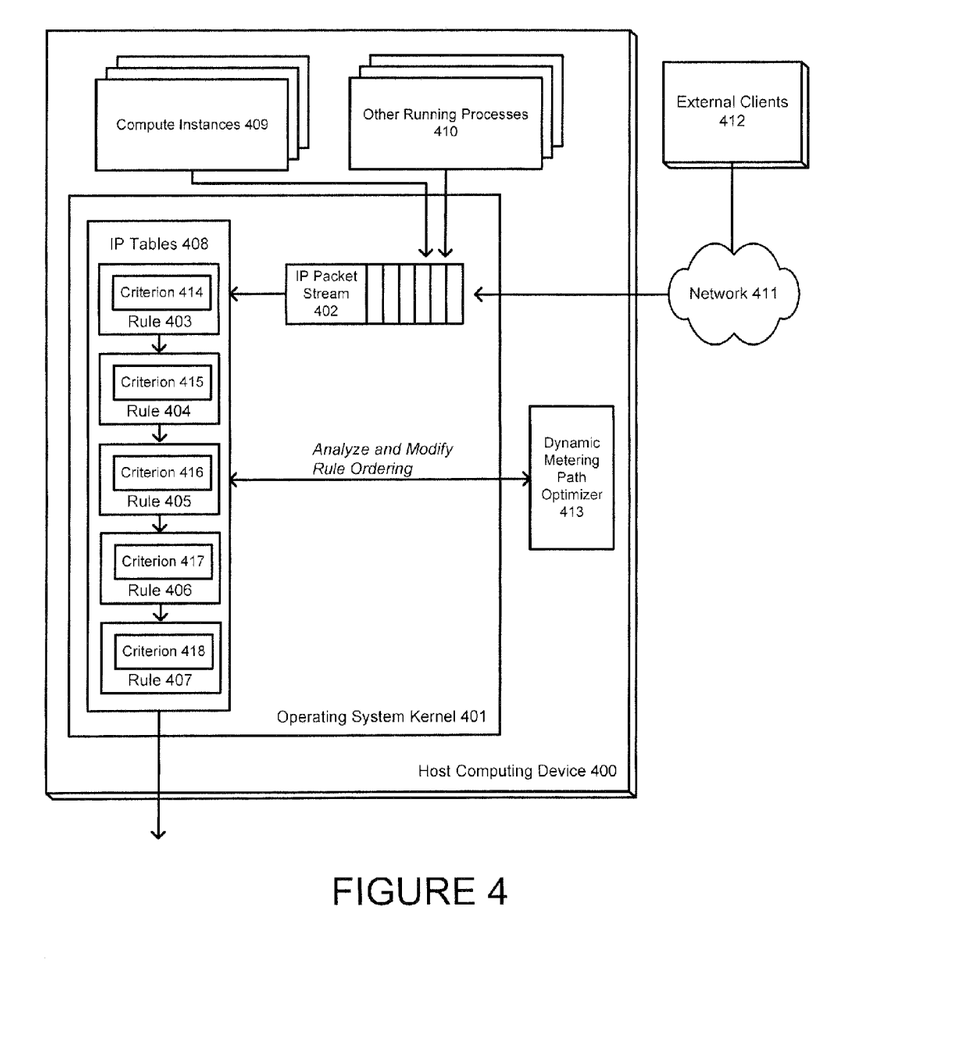
FIG. 4 is an example of a use case for utilizing the dynamic metering path optimization in a host computing device residing on a system of a service provider, in accordance with various embodiments.

FIG. 4 is an example of a use case for utilizing the dynamic metering path optimization in a host computing device residing on a system of a service provider, in accordance with various embodiments.

In the illustrated embodiment, the service provider 200 may maintain a host computing device 400 having an operating system, including a kernel 401 installed thereon. The kernel 401 is a main component of the operating system that serves as an intermediary for communication (e.g. memory input output I/O operations) between various software applications, compute instances 409, and other processes 410 and the hardware components of the device. In accordance with an embodiment, the kernel 401 includes a set of Internet Protocol (IP) tables 408 (e.g. iptables, ipchains, etc.) that provides a chain of rules (403, 404, 405, 406, 407). The IP tables 408 is an in-memory list of rules that are applied to all packets in the packet stream which is processed by the computing device. In various embodiments, the packets may be received from internal components such as compute instances 409 or running processes 410, or external components such as clients 412 over network 411. For example, packets originating with processes running locally on the computing device 400 may be considered output traffic, packets which are received from external components (e.g. client 412) which are directed to internal processes may be considered input traffic and packets which are received from external components and directed to other external components may be considered forward traffic.

In accordance with an embodiment, the iptables 408 rule chain (403, 404, 405, 406, 407) can be applied to all packets in the stream 402. As such, each packet will traverse the rule chain until the kernel determines that it matches a particular rule. At this point, the kernel may update the match count or other usage criteria. In accordance with an embodiment, the service provider 200 may utilize these counts and usage criteria (414, 415, 416, 417, 418) to meter the resource usage by its customers. For example, the rules (403, 404, 405, 406, 407) may be comprised of a list of subnets that form the service provider's network and allow the service provider to disambiguate intra resource center traffic from inter resource center traffic. This may help the service provider determine whether the traffic is destined for the service provider or for external entities over the Internet. In various alternative embodiments, the metering system can be utilized by the service provider for a variety of other purposes, as will be evident to one of ordinary skill in the art based on the teachings in this disclosure.

In accordance with an embodiment, the computing device 400 may further include a dynamic metering path optimizer 413 that periodically scans the rule chain in the iptables 408 and re-orders it based on the usage criterion (414, 415, 416, 417, 418). For example, as previously mentioned, the rule chain may be reordered according to the number of packets that have matched each rule, placing the rules having the highest number of matches in the beginning of the rule chain. Alternatively, the rule chain may be re-ordered based on velocity of matches or rate of change, as previously described. In various embodiments, because modifying the rules in-stream may be expensive in terms of latency, the dynamic metering path optimizer 413 may be an out-of-band component that scans the rule set upon expiration of specified time intervals. In some embodiments, this time period may be made configurable to allow a system administrator or technician to tune the performance of the optimizer 413.

In accordance with at least one embodiment, the system may restrict the number of changes that could be made to the rule chain in a given period of time. In some cases, modifying the rule ordering may be slightly disruptive to the normal processing of the system and therefore, in these embodiments, it may be advantageous to limit the number of changes to a specified number per unit time (e.g. 10 changes per hour, etc.).

Figure 5:
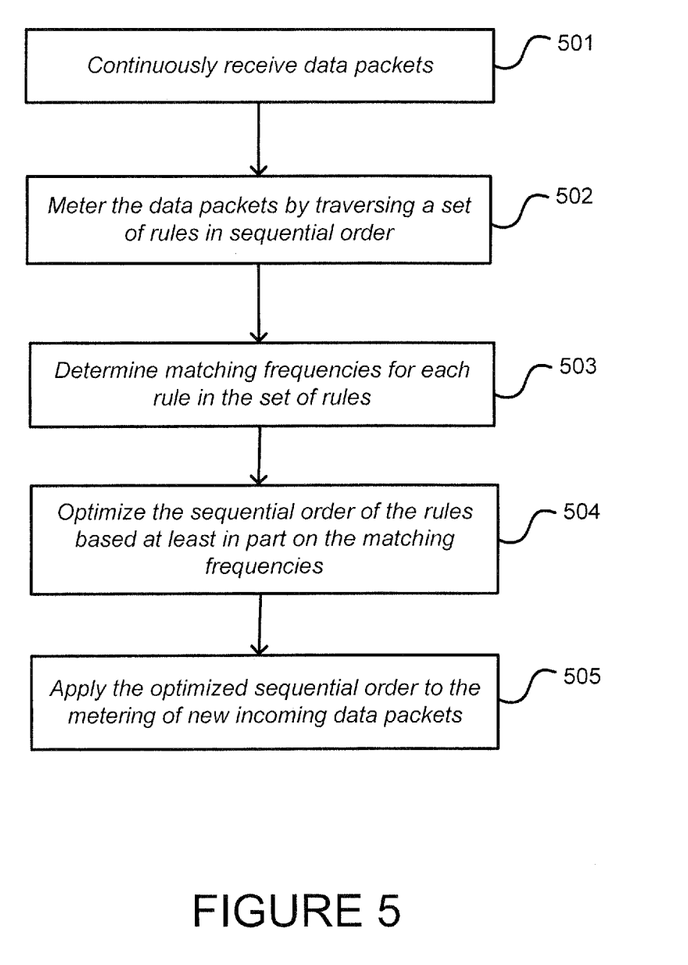
FIG. 5 illustrates an example process for dynamically optimizing the metering path, in accordance with various embodiments.

FIG. 5 illustrates an example process for dynamically optimizing the metering path, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the system continuously receives data packets (e.g. IP packets) for processing. The packets may be directed to, or received from, components that are internal to the system (e.g. locally running daemons) or external clients over a network, such as the Internet. Each packet may contain a set of data, and each packet may vary in size.

In operation 502, the system meters the data packets to determine one or more usage criteria. In at least one embodiment, the metering is performed by each packet traversing a set of rules in a particular sequential order. For example, for each given packet, the system may inspect the information in the packet and determine whether each rule in the chain matches the packet. Once the packet is determined to match a particular rule, the categorization of the packet can be deemed complete and the system can move to meter the next packet.

In operation 503, the system determines the matching frequency of each rule over a specified time interval. For example, the system may periodically determine how many data packets each rule has matched over the last 5 minute time interval. In some embodiments, the time interval may be set before initiating the metering system and may be made configurable by a network technician.

In operation 504, the system optimizes the sequential ordering of the rule set based at least in part on the matching frequency of each rule. For example, the system may inspect each rule and arrange them in the order of the number of items that each rule matched over the last specified time interval. Alternatively, the system may utilize other algorithms to optimize the rule ordering as previously described. In addition, the system can take into account a number of other parameters when optimizing the rule sequence, including but not limited to the service provider's customer network topology, location of various components that will receive the packet or that have originated the packet and the like.

In operation 505, the system applies the optimized sequential order to the metering of new incoming data packets. This can be performed by creating a new rule chain with the optimized sequence and replacing the existing chain in memory with the new chain. Alternatively, each rule may be separate modified by writing and deleting the rules in memory.

Figure 6:
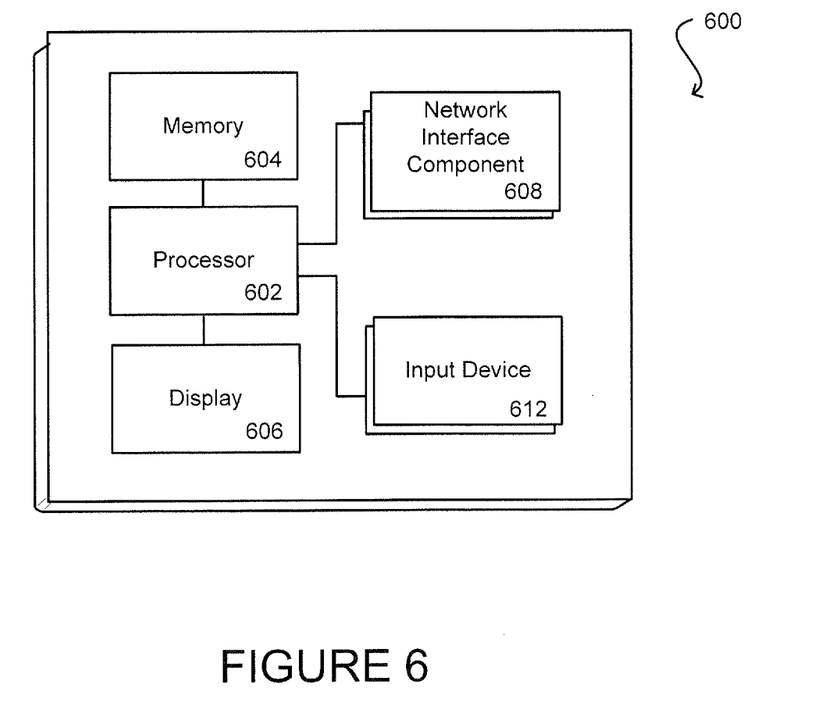
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for dynamic metering path optimization, said method comprising:
   under the control of one or more computer systems configured with executable instructions,
   receiving a plurality of data packets;
   metering the plurality of data packets, each data packet being metered by traversing the data packet through a chain of rules according to a first sequential order until the data packet matches a rule in the chain of rules;
   determining two or more matching frequencies for each rule in the chain of rules, each respective matching frequency for each rule in the chain of rules determined over a period of time;
   determining a matching velocity for each rule in the chain of rules, each respective matching velocity determined based on a difference between two matching frequencies of the two or more matching frequencies;
   determining a second sequential order for metering the plurality of data packets based at least in part on one or more respective matching frequencies and the respective matching velocity of each rule in the chain of rules; and
   applying the second sequential order to the metering of a plurality of subsequently received data packets by traversing each new data packet through the chain of rules according to the second sequential order until the each new data packet matches at least one rule in the chain of rules.

2. The computer implemented method of claim 1, wherein the chain of rules corresponds to an Internet Protocol (IP) table memory structure residing in a kernel of an operating system of the one or more computing systems.

3. The computer implemented method of claim 1, further comprising:
   determining a number of packets that matched each rule in the chain of rules over the period of time; and
   arranging the second sequential order such that rules matching a higher number of packets over the period of time are positioned in the second sequential order before rules that matched a lower number of packets over the period of time.

4. The computer implemented method of claim 1, further comprising:
   determining a number of bytes that matched each rule in the chain of rules over the period of time; and
   arranging the second sequential order such that rules matching a higher number of bytes over the period of time are positioned in the second sequential order before rules that matched a lower number of bytes over the period of time.

5. The computer implemented method of claim 1, further comprising:
   determining a number of bytes and a number of packets that matched each rule in the chain of rules over the period of time;
   applying a specified weight to each of the number of bytes and the number of packets; and
   arranging the second sequential order based at least in part on the number of bytes and the number of packets according the specified weight.

6. The computer implemented method of claim 1, further comprising:
   determining a second matching velocity for each rule in the chain of rules; and
   arranging the second sequential order based at least in part on the two matching velocities.

7. The computer implemented method of claim 6, further comprising:
   determining a matching acceleration for each rule in the chain of rules based at least in part on a comparison of the two matching velocities for a respective rule; and
   arranging the second sequential order based at least in part on the matching acceleration.

8. A computer implemented method, comprising:
   under the control of one or more computer systems configured with executable instructions,
   categorizing a plurality of data items according to a set of rules by applying the set of rules to each data item in a sequential order until the data item is determined to match at least one rule in the set of rules;
   maintaining two respective counts of a number of matches to the data items for each rule of the set of rules, each respective count determined over a specified time interval;
   determining a matching velocity for each rule in the set of rules, each respective matching velocity determined based on a difference between two respective counts of the two or more respective counts;
   metering usage of one or more resources based at least in part on the sequential order;
   determining the sequential order for applying the set of rules based at least in part on one or more of the respective counts of the number of matches and the respective matching velocity of each rule in the set of rules.

9. The computer implemented method of claim 8, wherein maintaining the count of the number of matches further includes at least one of:
   measuring a number of packets that matched each rule in the set of rules over the specified time interval;
   measuring a number of bytes that matched each rule in the set of rules over the specified time interval; or
   measuring both of the number of packets and the number of bytes and assigning a relative weight to each of the number of packets and the number of bytes.

10. The computer implemented method of claim 8, wherein optimizing the sequential order further includes:
    arranging the sequential order of the set of rules according to the number of matches to the data items of each rule, such that rules having a higher number of matches are applied to the data items before rules that have a lower number of matches.

11. The computer implemented method of claim 8, wherein optimizing the sequential order further includes:
    determining a matching acceleration of the matches based at least in part on the matching velocity; and
    arranging the sequential order of the set of rules based at least in part on matching acceleration.

12. The computer implemented method of claim 8, wherein each data item is an internet protocol (IP) packet, and wherein the set of rules is an IP table in a kernel of an operating system of the one or more computing systems.

13. The computer implemented method of claim 8, further comprising:
    restricting a number of times that the sequential order can be adjusted in a specified time period.

14. The computer implemented method of claim 8, further comprising:
    applying the set of rules in the adjusted sequential order to one or more subsequently received packets being processed by the one or more computing systems.

15. A computing system, comprising:
    at least one processor; and
    memory including instructions that, when executed by the processor, cause the computing system to:
    provision, by a service provider, one or more resources to a customer of the service provider;
    classify a plurality of items according to a sequence of rules by applying the sequence of rules to each item of the plurality of items until the item matches at least one rule in the sequence of rules;
    meter usage of the one or more resources by the customer based at least in part on the sequence of rules;
    record two respective matching counts for at least one rule of the sequence of rules, each respective matching count measured over a defined period of time, the matching count indicating a number of items that the at least one rule matched over the defined period of time;
    determine a matching velocity for the at least one rule in the sequence of rules, each respective matching velocity determined based on a difference between two respective matching counts of the two or more respective matching counts; and
    modify the sequence of rules based at least in part on one or more of the respective matching counts measured over the defined period of time and the matching velocity for the at least one rule in the sequence of rules.

16. The computing system of claim 15, wherein recording the matching count further includes at least one of:

recording a number of packets that matched the at least one rule in the sequence of rules over the defined period of time;

measuring a number of bytes that matched the at least one rule in the sequence of rules over the defined period of time; or measuring both of the number of packets and the number of bytes and assigning a relative weight to each of the number of packets and the number of bytes.

17. The computing system of claim 15, wherein modifying the sequence of rules further includes:

arranging the sequence of rules according to the number of items that each rule matched over the defined period of time, such that rules matching a higher number of items are applied before rules matching a lower number of items.

18. The computing system of claim 15, wherein modifying the sequence of rules further includes:

determining a matching acceleration based at least in part on the matching velocity measured over two or more periods of time; and arranging the sequence of rules based at least in part on the matching acceleration.

19. The computing system of claim 15, wherein each item is an internet protocol (IP) packet, and wherein the set of rules is a IP table in a kernel of an operating system of the computing system.

20. The computing system of claim 15, further comprising instructions for causing the system to:

restrict a number of times that the sequential order can be adjusted in a specified interval of time.

21. A non-transitory computer readable storage medium storing one or more sequences of instructions executable by one or more processors to perform a set of operations comprising:

categorizing a plurality of data items according to a set of rules by applying the set of rules to each data item according to a first order until the data item is determined to match a rule in the set of rules;

metering usage of one or more computing resources based at least in part on the set of rules;

maintaining a usage criterion associated with the set of rules being applied to the data items measured over a time interval;

determining a second order based at least in part on the usage criterion measured over the time interval;

applying the set of rules to each new data item according to the second order until the new data item is determined to match a rule in the set of rules;

determining a velocity of matches by comparing a difference between the number of matches for at least one of the set of rules over at least two time intervals; and arranging the set of rules based at least in part on the velocity of matches determined over the at least two time intervals.

22. The non-transitory computer readable storage medium of claim 21, wherein maintaining the usage criterion further includes at least one of:

measuring a number of packets that matched each rule in the set of rules over the time interval;

measuring a number of bytes that matched each rule in the set of rules over the time interval; or measuring both of the number of packets and the number of bytes and assigning a relative weight to each of the number of packets and the number of bytes.

23. The non-transitory computer readable storage medium of claim 21, wherein determining the second order further includes:

arranging the set of rules according to a number of matches to the data items of each rule, such that rules having a higher number of matches are applied to the data items before rules that have a lower number of matches.

24. The non-transitory computer readable storage medium of claim 21, wherein determining the second order further includes:

determining a matching acceleration of the matches based at least in part on the velocity of matches over two or more time intervals; and arranging the set of rules based at least in part on the matching acceleration.

* * * * *